United States Patent [19]

Trickel

[11] Patent Number: 4,938,581

[45] Date of Patent: Jul. 3, 1990

[54] HOLDER FOR USE WITH EYEWEAR

[75] Inventor: John Trickel, Tulsa, Okla.

[73] Assignee: Allen D. West, Tulsa, Okla.

[21] Appl. No.: 390,405

[22] Filed: Aug. 7, 1989

[51] Int. Cl.$^5$ ............................................. G02C 3/00
[52] U.S. Cl. ..................................... 351/156; 351/157
[58] Field of Search ....................... 351/155, 156, 157; 2/13

[56] References Cited

U.S. PATENT DOCUMENTS 390,018  9/1886  Waddell ............................... 351/156

FOREIGN PATENT DOCUMENTS 1319413  1/1963  France ................................ 351/155

Primary Examiner—Paul M. Dzierzynski
Attorney, Agent, or Firm—Head & Johnson

[57] ABSTRACT

A holder for use with eyewear having spaced apart lens portions connected by a nose portion in which the eyewear, when not in use, is conveniently suspended form the user's neck, the holder being in the form of a member of flexible plastic material, such as teflon, haivng opposed generally parellel sides, a top and having a cutout providing communication with the member external peripheral surface and having an unlocked mode providing an opening to receive the nose portion of eyewear therein so that the nose portion is loosely received in the cutout and providing a locked mode in which the eyewear nose portion is surrounded and retained by the member, a cord of length to loop around the neck of the user, and an opening in the holder through which the cord passes by which the member is retained.

6 Claims, 2 Drawing Sheets

HOLDER FOR USE WITH EYEWEAR

SUMMARY OF THE INVENTION

A large majority of people in the world today use eye glasses, either for correction of vision or to reduce the intensity of light, that is, sunglasses. Most user's of eyewear have frequent need to remove the eyewar yet keep it conveniently located so as to be readily when needed to be replaced back on the face of the user. Users typically place their removed eyewear in their shirt pocket, in a container or purse, or lay the eyewear down on a convenient location. Some hang eyewear from the neckline of their shirt by extending one of the ear pieces inside the shirt and thereby allow the balance of the eyewear to hang on the front of the shirt.

All of these methods of storing eyewear when not in use have problems. Many shirts don't have pockets, or if they have pockets, when the user bends over the eyewears is in danger of slipping out. Purses or containers for eyewear are frequently not readily available when the user needs to make immediate use of his eyewear, and when the eyewear is laid on a nearby surface it frequently is misplaced or lost entirely.

One method of retaining eyewear convenient to the user is by suspending it from a cord looped around the neck of the user. For examples of this convenience, reference may be had to U.S. Pat. Nos. 2,649,020; 2,798,409; and 2,941,268. These references show various means of attaching cords to the earpieces of eyewear and each requires some type of device attached to or formed integrally with the ear piece. These devices are not easily removable from the eyewear.

Other have provided clips for attaching to the eyewear such as shown in Pat. No. 2,766,500. Such clips require frictional engagement with the eyewear and the eyewear can be inadvertently dislodged from the clips. The present disclosure is intended to overcome limitations in eyewear retention devices such as illustrated in these previously issued patents.

The present disclosure is in the form of a holder for use with eyewear when the eyewear is of the type having spaced apart lens portions connected by a nose portion. The holder includes a unitary member made of flexible material, preferably plastic, and most preferably Teflon, however, nylon or other forms of plastic may also be used. The member has opposed generally paralleled sides, a top and an external peripheral surface. A cutout is formed within the member and the cutout communicates with the external peripheral surface. The cutout provides an integral leg portion and an integral portion. In the locked mode, the leg portion extends under and is retained by the hook portion. To change from the locked to the unlocked mode, the leg portion can be snapped, by flexing the member, out from under the hook portion to provide an opening through which the nose portion of eyewear can pass.

A cord of length to loop around the neck of the user is employed and some means is provided for attachment of the cord to the member. In the preferred arrangement, the member has a small area opening spaced from the cutout through which the cord passes.

In the preferred arrangement, the cutout is configured in the area of the member spaced from the top by a first generally U-shaped portion dimensioned to loosely receive the nose portion of eyewear made of plastic. In addition, the cutout is further configured by a separate generally U-shaped portion of smaller width than the first U-shaped portion and dimensional to loosely receive the nose portion of eyewear made of metal, or at least wherein the nose portion is metal —that is, of small diameter meterial compared to the typical plastic frame eyewear. For reference to an integral member having a locked and an unlocked position, U.S. Pat. No. 1,221,996 is an example. However, this disclosure provides a unitary member which does not include the features of the disclosure herein.

A better understanding of the invention will be had by reference to the following description and claims, taken in conjunction with the attached drawings.

DESCRIPTION OF THE PREFERRED EMBODIMENT

Figure 1:
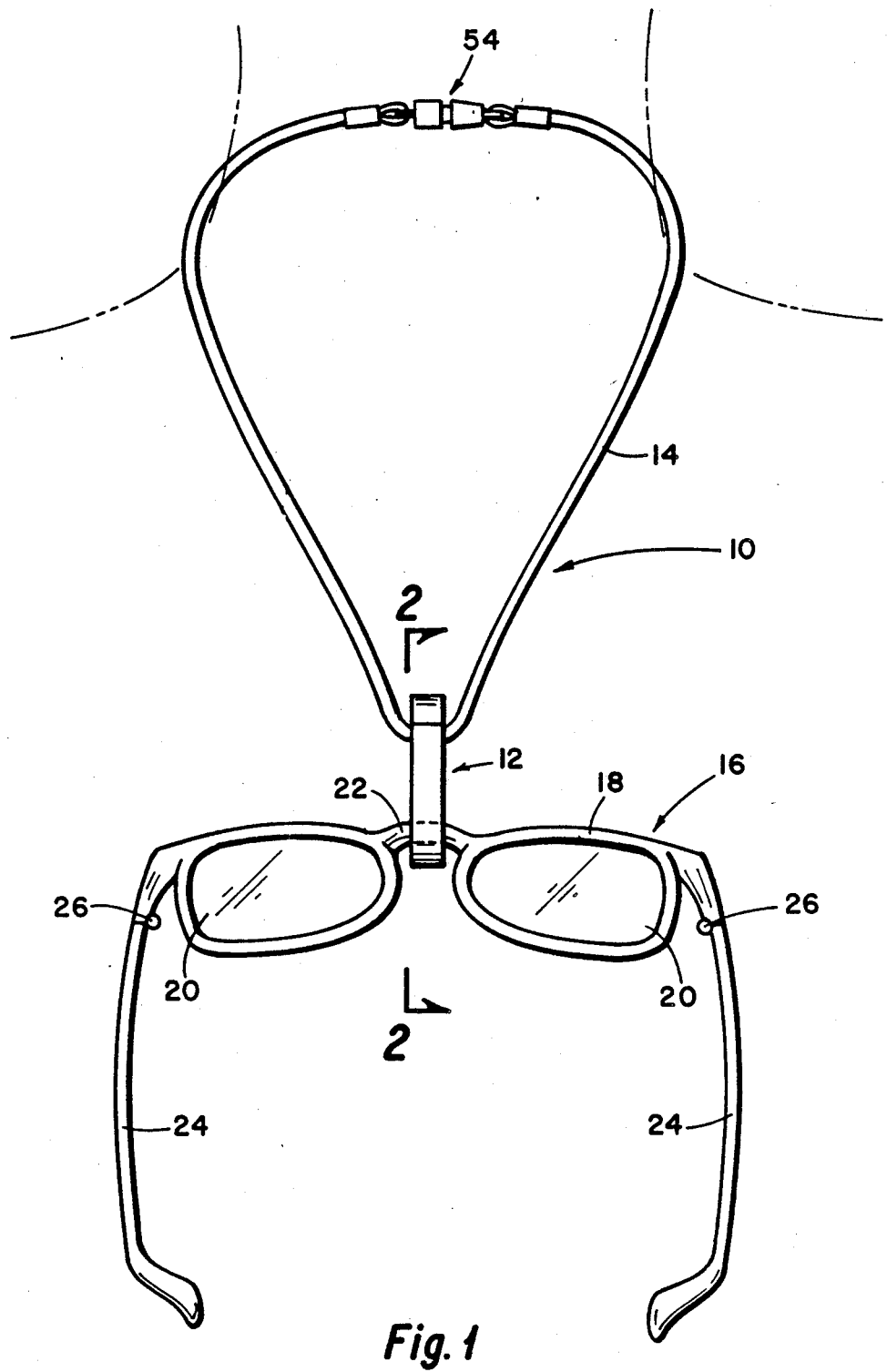
FIG. 1 is an elevational view of the eyewear holder of this disclosure, and showing the eyewear holder in use as suspendend from the neck of a user, and showing eyewear retained by the holder.

Referring to FIG. 1, the holder for use with eyewear is generally indicated by the numeral 10. The holder includes two basic portions, that is, a unitary member 12 formed of plastic material, such as teflon, and a cord 14. Member 12 has a locked and unlocked positon. In the unlocked position, it can accept or be removed from eyewear generally indicated by the numeral 16. The eyewear 16 is generally formed of a frame 18, supporting two spaced apart lenses 20 which are connected together by a nose portion 22. The frame 18 further includes ear pieces 24 which are typically attached to the frame about pivots 26.

The preferred configuration of holder 12 is shown in FIGS. 2 through 5. The holder is a unitary member of flexible material, such as of plastic. A preferred plastic is Teflon is preferred because it is the material best known as that which would least likely scratch or mar the lens portion 20 of the eyewear. It should be understood, however, that the invention is not limited to the use of Teflon—which is merely the preferred material, and that the member 12 can be made of other types of plastics, including nylon.

The member 12 has opposed generally parallel sides 28, although the use of precisely parallel sides is not imperative to the function of the holder.

Formed in the member 12 is a cutout generally indicated by the numeral 32.

Figure 4:
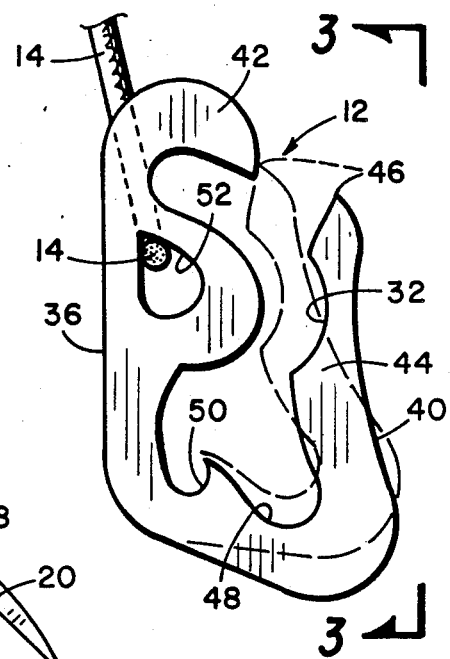
FIG. 4 is a partial side view as in FIG. 2 but showing the member in the unlocked position and without eyewear retained therein.
Figure 3:
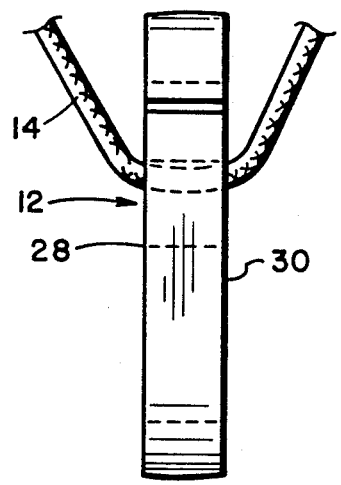
FIG. 3 is a partial front view, enlarged, of the holder member of FIG. 1.

The member 12 includes a top 34, a back surface 36, a bottom 38 and a front surface 40. The cutout, which can be formed such as by means of a laser, communicates with the external surface. FIG. 4 shows the configuration of the member 12 wherein the member is in the open position to receive or removed therefrom, the nose portion of eyewear frames. The member can also be manufactured by extruding an elongated piece having the shape of FIG. 2 or 4 and thereafter cut into pieces with parallel sides as shown FIG. 3. In addition, the member can be molded of any suitable plastic material.

Figure 2:
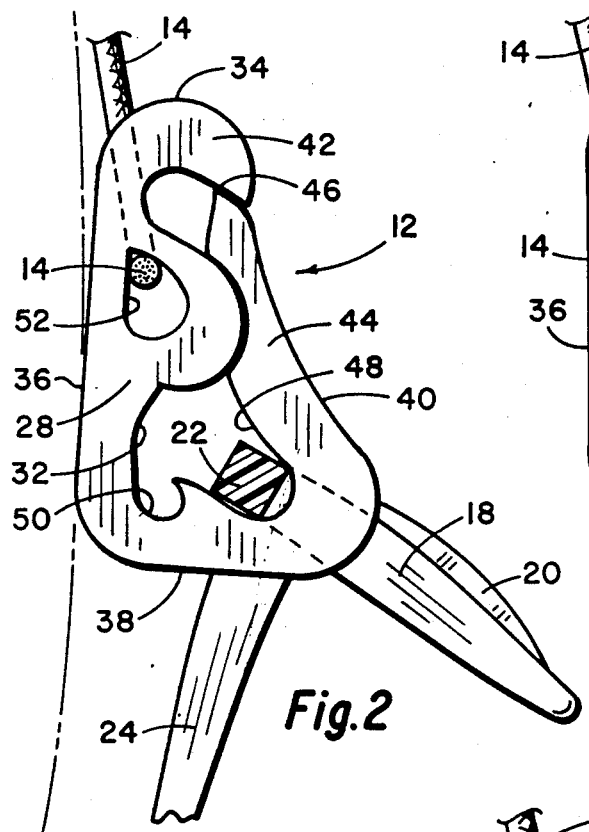
FIG. 2 is a fragmentary elevational side view as taken along the line 2—2 of FIG. 1 showing the holder member, a lower portion of the cord, and a portion of eyewear as retained by the member.
Figure 5:
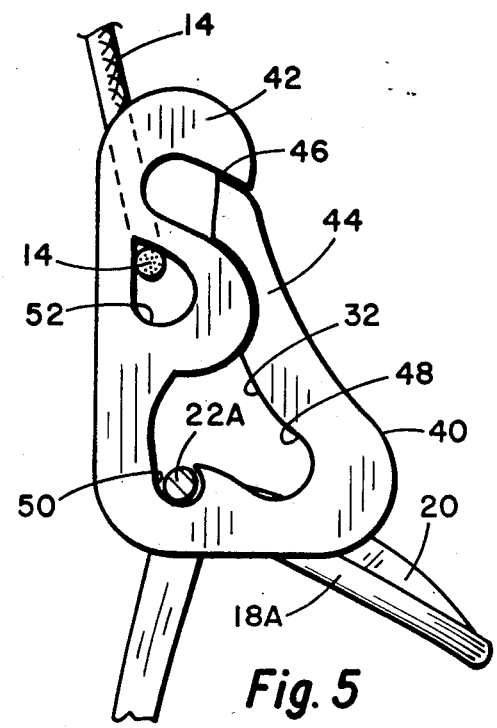
FIG. 5 is a side view as in FIG. 2 but showing eyewear retained in the member wherein the eyewear nose portion is formed of wire, that is, of a small diameter meterial compared to that typically employed of eyewear made with a plastic frame.

The cutout provides an integral hook portion 42 which is adjacent the top 34, and an integral leg portion 44 which is spaced from the top 34 and includes the front surface 40. In the original cutout position, the member 12 is in the locked position, that is, where the leg portion is received by the nose portion 22. Further, after opening the leg portion 44 can be snapped back into locked position as illustrated in FIGS. 2 and 5 wherein the upper end 46 of leg portion 44 is beneath the hook portion 42. In this locked mode, the cutout 32 is closed, that is, confined so that the nose portion 22 of eyewear received within the cutout portion is locked to the member 12 and the eyewear can not be inadvertently removed.

The cutout 32 preferably includes a first generally U-shaped portion 48 which is spaced from the top 34 and adjacent the bottom 38. The width of the first U-shaped portion 48 is such as to receive the nose portion 22 of eyewear typically made of plastic meterial.

In addition, as illustrated in FIGS. 2, 4 and 5, the cutout 32 preferably includes a second U-shaped portion 50 which is of smaller width than the first U-shaped portion 48 and is dimensioned to receive loosely therein the nose portion 22A of eyewear, as shown in FIG. 5, in which such nose portion is formed of a small diameter material, such as when the frame 18A is formed of metal.

In addition to cutout 32, the member 12 preferably includes an opening 52 therein which is spaced from the cutout 32, and below the top 34 and which receives cord 14. This provides a means of attachment of cord 14 to the member 12. The shape of the opening can vary, and it can be circular.

The back surface 36 of member 12 is preferably flat, as illustrated, since this surface bears against the front of the user. The cord 14 can be of flexible material like cotton, plastic, leather, or so forth, or can be a metal chain. Any flexible small diameter elongated member of the type which can be worn around the neck of a user can function as the cord 14. In addition, the cord 14 may include a connector 54 by which the ends of the cord may be releasably secured to each other to form a closed loop. The connector 54 may be any type which is commonly employed for necklaces, such as the type which is screwed and unscrewed or which is hooked together. The use of the connector 54 is optical since the cord 14 may be of length such as to simply loop over the head of the user, in which case a connector is not required.

The holder 10 may be loosely suspended around the neck of the user with eyewear placed in the cutout 32 in member 12. If the user intends to place the eyewear in the holder only temporarily or under conditions where minimal activity is expected, the user may leave the holder in the unlocked position. However, if the user wants to be certain that the eyewear will not be inadvertently lost, the member 12 can be snapped to the locked position as shown in FIGS. 2 and 5. This is achieved by applying manual pressure between the back surface 36 and the front surface 40. To unlock the member, the user applies manual pressure against the member at the hook portion 42 and simultaneously pushes downwardly on the front surface 40 adjacent the bottom surface 48 to cause leg portion 44 to be drawn out from under hook portion 42. In this manner the member 12 can be easily manually moved between the locked and unlocked position. Moving the member to the locked position normally is easily accomplished with one hand, using the thumb and index finger. To move the member to the unlocked position normally requires two hands with the finger of one hand on the hook portion 42 and the finger of the other hand on the lower end of the front surface 40 and the thumb on the lower portion of back surface 36.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A holder for use with eyewear of the type worn on the face of the user having spaced apart lens portions connected by a nose portion, in which the eyewear when not in use is conveniently suspended from the users neck, comprising:

a member of flexible material having opposed generally paralleled sides, a top and an external peripheral surface, and having a cutout therein providing communication with the member external peripheral surface and having an unlocked mode providing an opening adjacent the top to receive the nose portion of eyewear therein whereby the nose portion is loosely received in said cutout, and providing a locked mode wherein an eyewear nose portion is surrounded by the member;

a cord of length to loop around the neck of the user; and means of attaching said cord to said member.

2. An eyewear holder according to claim 1 wherein said member has an opening therein spaced from said cutout and wherein said cord is received through said opening providing said means of attachment of said cord to said member.

3. An eyewear holder according to claim 1 wherein said cutout in said member provides, adjacent said top, an integral hook portion, and provides therebelow an integral leg portion, the leg portion being extendable under said hook portion to provide said locked mode and wherein by flexing said member said leg portion can be removed from under said hook portion to provide access to pass an eyewear nose portion into and out of said cutout.

4. An eyewear holder according to claim 1 wherein said cutout is configured in the area of said member spaced from the top by a first generally U-shaped portion dimensioned to loosely receive the nose portion of eyewear made of plastic and wherein said cutout is further configured by a separate generally U-shaped portion of smaller width than said first U-shaped portion and dimensioned to loosely receive the nose portion of eyewear made, at least in the nose part of metal.

5. An eyewear holder according to claim 1 wherein said member has a back exterior surface which is generally flat.

6. An eyewear holder according to claim 1 wherein said member is made of Teflon.

* * * * *

UNITED STATES PATENT AND TRADEMARK OFFICE
CERTIFICATE OF CORRECTION

PATENT NO. : 4,938,581

DATED : July 3, 1990

INVENTOR(S) : Trickel

It is certified that error appears in the above-identified patent and that said Letters Patent is hereby corrected as shown below:

ON THE TITLE PAGE

Item [57], line 5, change "haivng" to --having--.
Item [57], line 6, change "parellel" to --parallel--.

Column 1, line 34, change "Other" to --Others--.
Column 2, line 4, change "meterial" to --material--.
Column 3, line 26, change "meterial" to --material--; line 53, change "optical" to --optional--.

Signed and Sealed this

Eighteenth Day of February, 1992

Attest:

HARRY F. MANBECK, JR.

Attesting Officer     Commissioner of Patents and Trademarks